United States Patent [19]

Fukuo et al.

[11] Patent Number: 6,039,795
[45] Date of Patent: Mar. 21, 2000

[54] INK COMPOSITION FOR OIL MARKING PEN

[75] Inventors: Hidetoshi Fukuo, Osaka; Masakazu Yokoi, Higashiosaka, both of Japan

[73] Assignee: Sakura Color Products Corporation, Osaka, Japan

[21] Appl. No.: 08/986,640

[22] Filed: Dec. 8, 1997

[30] Foreign Application Priority Data

Dec. 10, 1996 [JP] Japan .................................. 9-351938
Jul. 4, 1997 [JP] Japan .................................. 9-194990

[51] Int. Cl.⁷ .................................................. C09D 11/00
[52] U.S. Cl. .................................... 106/31.58; 106/31.86
[58] Field of Search .............................. 106/31.58, 31.86

[56] References Cited

U.S. PATENT DOCUMENTS 4,338,133  7/1982  Toyoda et al. ........................ 106/31.58
4,589,920  5/1986  Kanada et al. ........................ 106/31.58

OTHER PUBLICATIONS

Kirk–Othmer, Concise Encyclopedia of Chemical Technology, pp. 1062–1063 (1983).

*Primary Examiner*—Melvyn I. Marquis
*Attorney, Agent, or Firm*—Armstrong, Westerman, Hattori, McLeland and Naughton

[57] ABSTRACT

An ink composition for an oil marking pen is provided which comprises a coloring agent, an organic polar solvent, an oil-soluble resin and an organically modified silicone as principal components thereof. The organically modified silicone is selected from dimethyl silicone, alkyl-modified silicones, polyether-modified silicones such as a polyoxypropylene modified silicone and the like, and is contained in the ink composition in a proportion of 0.005 wt % to 10 wt %. The organic polar solvent is selected from alcohol solvents and glycol ether solvents. The oil-soluble resin is selected from ketone resins, phenol resins, xylene resins, rosin resins, styrene-organic acid copolymers and polyacrylates. The ink composition of the present invention is excellent in the ink film fixability when applied on a nonabsorbent surface such as a metal surface or a plastic surface, and suitable for oil marking pens.

19 Claims, No Drawings

INK COMPOSITION FOR OIL MARKING PEN

FIELD OF THE INVENTION

The present invention relates to an ink composition for an oil marking pen and, more particularly, to an ink composition for an oil marking pen which ensures an excellent ink film fixability when applied on a nonabsorbent surface such as a metal surface or a plastic surface.

BACKGROUND ART

It has been a conventional practice to employ nonpolar solvents such as xylene as a solvent for an ink composition for an oil marking pen. In recent years, polar solvents such as alcohols and glycol ethers have been substituted for the nonpolar solvents as the solvent for the ink composition in view of safety.

However, the use of the polar solvents in place of the nonpolar solvents tends to reduce the ink film fixability (the fastness of drawn ink lines such as of letters and illustrations) on a nonabsorbent surface such as a metal surface or a plastic surface, though an excellent ink film fixability is a critical requirement for oil marking pens. This tendency is attributable to the fact that the use of the polar solvents weakens hydrogen bonds between the ink composition and the nonabsorbent surface and an etching effect on the nonabsorbent surface, which may be strong enough to ensure a satisfactory ink film fixability in the case of an ink composition containing a nonpolar solvent, thereby to deteriorate the ink film adherability and fixability on the nonabsorbent surface.

To cope with this problem, the ink film fixability on the nonabsorbent surface is improved by adding a resin or the like to the oil marking pen ink composition containing the polar solvent. For example, Japanese Unexamined Patent Publications No. 3-97773 (1991), No. 3-172366 (1991) and No. 3-250073 (1991) respectively disclose: an ink composition containing a condensation resin of formaldehyde and toluenesulfonamide; an ink composition containing a vinyl acetate resin; and an ink composition containing a polyamide resin and an alcohol-soluble resin (e.g., phenol resin). Further, Japanese Unexamined Patent Publication No. 4-139273 (1992) discloses an ink composition employing, in combination, a resin such as an acrylic resin or a polyamide resin having a hydrophilic group and a resin such as a ketone resin or a rosin-modified maleic acid resin having a hydrophobic group. Japanese Unexamined Patent Publication No. 4-168169 (1992) proposes an ink composition employing, in combination, a resin such as a rosin-modified maleic acid resin or a saturated polyester resin having an acid value of not higher than 10 and a resin such as a ketone resin or a polyamide resin having an acid value of not lower than 80. Japanese Unexamined Patent Publications No. 4-227670 (1992), No. 4-239071 (1992) and No. 4-266975 (1992) respectively disclose: an ink composition containing a polyvinyl alkyl ether and a styrene-acrylic acid copolymer; an ink composition containing a condensation resin of an aldehyde and urea and a cationic surface active agent; and an ink composition containing rosin, a rosin-modified resin, a ketone resin, a methyl ester of hydrogenated rosin, a hydrogenated triethylene glycol ester and the like. Further, Japanese Unexamined Patent Publications No. 5-17717 (1993), No. 5-279616 (1993) and No. 7-118590 (1995) respectively disclose: an ink composition containing an ethanol-soluble ketone resin having a softening point of 60° C. to 100° C. and a phenol resin having a softening point of 60° C. to 100° C.; an ink composition employing a ketone resin, a phenol resin, a rosin resin, a butyral resin and/or a polyamide resin; and an ink composition containing a ketone resin, a phenol resin, a rosin resin, a butyral resin, a polyamide resin and a phthalate.

Even with these ink compositions, the ink film fixability (the fastness of drawn ink lines such as of letters and illustrations) on a nonabsorbent surface such as a metal surface or a plastic surface is unsatisfactory. Therefore, an ink composition having a satisfactory ink film fixability has not been provided yet.

SUMMARY OF THE INVENTION

As a result of intensive studies concerning the fact that the ink film fixability (the fastness of drawn ink lines) on the nonabsorbent surface cannot satisfactorily be improved with the conventional marking pen ink composition employing an alcohol solvent or a glycol ether solvent, it has been found that this problem cannot be solved only by enhancing the adherability and fixability of solid components such as a resin component and a dye component in the ink film on the nonabsorbent surface. As a matter of course, the adherability and fixability of the solid components in the ink film greatly contribute to the improvement of the ink film fixability.

However, the enhanced adherability and fixability of the ink film on the nonabsorbent surface permit the ink film to readily adhere onto any other objects brought in contact with the surface of the ink film. That is, the tendency toward the adherence of the ink film on any other objects increases proportionally to the adherability and fixability of the ink film on the nonabsorbent surface. Accordingly, the combinational use of various resins for the enhancement of the adherability and fixability of the ink film on the nonabsorbent surface undesirably enhances the adherence of the ink film on any other objects as well. When the ink film is brought in chafing contact with a finger, a cloth, paper or the like, for example, the ink film readily adheres thereon. Therefore, practical improvement of the fixability of the ink film cannot be achieved.

As a result of intensive studies in view of the foregoing, the inventors of the present invention have found that an ink composition containing an organically modified silicone (organically modified polysiloxane) in combination with a coloring agent, an organic polar solvent and an oil-soluble resin can improve the ink film fixability on a nonabsorbent surface, and attained the present invention. Since the organically modified silicone is less miscible with the organic polar solvent and has a characteristic surface activity, the organically modified silicone migrates to the surface of the ink film when the ink composition is applied on the nonabsorbent surface. As a result, the organically modified silicon exhibits an adherence suppressing property on the ink film surface to prevent the ink film from adhering onto any other objects without affecting the fixability of the ink film on the nonabsorbent surface. Therefore, the ink film is less liable to adhere onto a finger, a cloth, paper or the like when the ink film is brought in chafing contact therewith. Accordingly, the ink film fixability is practically improved. The ink composition containing the organically modified silicone provides an ink film exhibiting a high adherability and fixability on the nonabsorbent surface as well as a low surface adherability to any other objects.

In accordance with a first aspect of the present invention, there is provided an ink composition for an oil marking pen, which comprises a coloring agent, an organic polar solvent, an oil-soluble resin and an organically modified silicone.

Although the ink composition of the present invention employs the organic polar solvent, the use of the organically modified silicone ensures that the ink film fixability of the ink composition on a nonabsorbent surface such as a metal surface or a plastic surface is kept at a level equivalent to or greater than that of an ink composition containing a nonpolar solvent (e.g., xylene) as the solvent.

In accordance with one preferred embodiment of the present invention, the organically modified silicone is preferably at least one selected from the group consisting of dimethyl silicone, alkyl-modified silicones, aryl-modified silicones, aralkyl-modified silicones, polyether-modified silicones, polyester-modified silicones, aralkyl-polyether-modified silicones and polyether-polyester-modified silicones, among which the polyether-modified silicones are more preferable and a polyoxypropylene-modified silicone is particularly preferable.

The polyoxypropylene-modified silicone preferably has a number average molecular weight of 2,000 to 20,000.

In accordance with another preferred embodiment of the present invention, the organically modified silicone is contained in the ink composition in a proportion of 0.005 wt % to 10 wt % relative to the overall ink composition. Particularly, the polyoxypropylene-modified silicone is contained in a proportion of 0.01 wt % to 10 wt % relative to the overall ink composition.

Usable as the organic polar solvent are alcohol solvents and glycol ether solvents. These organic polar solvents are harmless to human body and highly safe in use.

Preferably used as the oil-soluble resin (hereinafter referred to simply as 'resin') is at least one selected from the group consisting of ketone resins, phenol resins, xylene resins, rosin resins, styrene-organic acid copolymers and polyacrylates.

In accordance with still another embodiment of the present invention, the ink composition further contains at least one selected from a viscosity controlling agent, a structural viscosity imparting agent, a dye solubilizing agent and a drying agent.

It is an object of the present invention to provide an ink composition for an oil marking pen which employs an organic polar solvent as the solvent and yet ensures an excellent ink film fixability. It is another object of the present invention to provide an ink composition for an oil marking pen which employs an organic polar solvent as the solvent and yet ensures that the ink film fixability on a nonabsorbent surface such as a metal surface or a plastic surface is kept at a level equivalent to or greater than that of an ink composition containing an organic nonpolar solvent (e.g., xylene) as the solvent.

BEST MODE FOR CARRYING OUT THE INVENTION

Organically Modified Silicone

In accordance with the present invention, the ink composition for an oil marking pen is characterized by the organically modified silicone contained therein. As described above, the organically modified silicone permits the ink composition to provide an ink film (drawn ink lines) having a less adherent surface property to any other objects, thereby improving the ink film fixability. That is, the present invention employs the organically modified silicone as a substance for forming a less adherent surface layer in the ink film.

The organically modified silicone has, for example, a structural unit represented by the following formula (1):

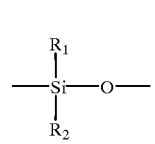

(wherein $R_1$ and $R_2$ are the same or different, each representing an alkyl group, an aryl group, an aralkyl group, a group including a polyether unit, or a group including a polyester unit).

In the formula (1), the alkyl group has 1 to 4 carbons, and examples thereof include methyl, ethyl and propyl, among which methyl and ethyl are preferable and methyl is particularly preferable. Examples of the aryl group include phenyl and the like. Examples of the aralkyl group include benzyl and the like.

Specific examples of the organically modified silicone include dimethyl silicone, alkyl-modified silicones, aryl-modified silicones, aralkyl-modified silicones, polyether-modified silicones, polyester-modified silicones, alkyl-polyether-modified silicones and polyether-polyester modified silicones, among which dimethyl silicone, alkyl-modified silicones and polyether-modified silicones are preferred.

More specific examples of the organically modified silicone include those commercially available from Tego Chemie Service GmbH under the trade names of "TEGO GLIDE 100", "TEGO AGLIDE A-115", "TEGO GLIDE B-1484", "TEGO GLIDE 200", "TEGO GLIDE ZG-400", "TEGO GLIDE 410", "TEGO GLIDE 420", "TEGO GLIDE 440" and "TEGO GLIDE 450". These organically modified silicones correspond to those commercially available from Kyoei Chemical Co., Ltd. under the trade names of "GLANOL 110", "GLANOL 115", "GLANOL B-1484", "GLANOL 200", "GLANOL 400", "GLANOL 410", "GLANOL 420", "GLANOL 440" and "GLANOL 450".

Other examples of the organically modified silicone include those commercially available from Toshiba Silicone Co., Ltd. under the trade names of "TSF4452" and "TSF4460", and those commercially available from Shinetsu Chemical Industry Co., Ltd. under the trade names of "KF352A", "KF615A", "KF6008" and "KF6012".

In the present invention, the polyether-modified silicones are preferable, among which a polyoxypropylene-modified silicone is particularly preferable. More specifically, the polyoxypropylene-modified silicone ensures the greatest surface adherence suppressing effect among the polyether-modified silicones. The polyoxypropylene-modified silicone is herein meant by a polyether-modified silicone having a polyoxypropylene unit alone as the polyether unit.

The polyether-modified silicone includes a polyoxyethylene unit and/or a polyoxypropylene unit as the polyether unit. The hydrophilic property of the polyether-modified silicone is enhanced with an increase in the proportion of polyoxyethylene in the polyether, while the hydrophobic property of the polyether-modified silicone is enhanced with an increase in the proportion of polyoxypropylene in the polyether. That is, the affinity of the polyether-modified silicone for organic polar solvents (such as alcohols and glycol ethers) is reduced with an increase in the proportion of polyoxypropylene in the polyether. Where an organically modified silicone including polyoxypropylene in a greater proportion is added to an ink composition containing an organic polar solvent, the modified silicone migrates to the surface of an ink film of the resulting ink composition as the organic polar solvent in the ink composition evaporates or vaporizes.

Usable as the polyether-modified silicone in the present invention are polyether-modified silicones including polyoxypropylene as the polyether in a high proportion, for example, those including polyoxypropylene in a proportion of 50 wt % or greater (more preferably 70 wt % or greater, still more preferably 90 wt % or greater) of the polyoxypropylene portion relative to the overall polyether portion. Particularly preferred is a polyoxypropylene-modified silicone. That is, the polyoxypropylene-modified silicone ensures the greatest surface adherence suppressing effect among the polyether-modified silicones.

The polyoxypropylene-modified silicone to be used is not particularly limited, but a commercially available polyoxypropylene-modified silicone oil may be used. Examples of the polyoxypropylene-modified silicone oil include those commercially available from Toshiba Silicone Co., Ltd. under the trade name of "TSF4460", and from Tego Chemie Service GmbH under the trade mane of "TEGO GLIDE A-115".

The number average molecular weight (hereinafter referred to simply as "molecular weight") of the organically modified silicone is not particularly limited, but may be in a range from about 1,000 to about 60,000, for example. More specifically, in the case of the polyoxypropylene-modified silicone, the molecular weight thereof is about 1,000 to about 30,000, preferably about 2,000 to about 20,000, more preferably about 5,000 to about 20,000. If the organically modified silicone has an excessively low molecular weight, the resulting ink composition has a reduced water resistance. If the organically modified silicone has an excessively high molecular weight, the surface adherence suppressing effect and the ink film fixability are reduced because it is difficult for the organically modified silicone to migrate to the surface of an ink film of the resulting ink composition.

The organically modified silicone may be contained in the ink composition in a proportion between 0.005 wt % and 10 wt % relative to the overall ink composition, which may vary depending on the type of the organically modified silicone and the type of the other ingredients (coloring agent and resin). The proportion of the organically modified silicone is preferably about 0.1 wt % to about 5 wt %, more preferably about 0.2 wt % to about 4 wt %. If the proportion of the organically modified silicone is higher than the aforesaid range, the organically modified silicone may migrate not only to the surface of an ink film of the resulting ink composition but also to a portion of the ink film closer to the surface of an article on which the ink composition is applied, so that the ink composition is prevented from firmly adhering onto the surface of the article and suffers like side effects. If the proportion of the organically modified silicone is lower than the aforesaid range, the surface adherence suppressing property and the ink film fixability are reduced. In the case of the polyoxypropylene-modified silicone, the proportion thereof is preferably 0.01 wt % to 10 wt % relative to the overall ink composition.

Coloring Agent

The coloring agent to be used in the present invention is not particularly limited, but is preferably highly safe in every aspect. The coloring agent is preferably soluble in the organic polar solvent which will be described later, or made soluble in the organic polar solvent with the use of a solubilization assisting agent (solubilizing agent). Examples A of the coloring agent include oil-soluble black nigrosine dyes such as commercially available from Chuo Synthetic Chemical Co., Ltd. under the trade name of "OIL BLACK 2030", oil-soluble black dyes such as commercially available from Orient Chemical Co., Ltd. under the trade name of "BARYFAST BLACK 3810", oil-soluble red dyes such as commercially available from Orient Chemical Co., Ltd. under the trade name of "BARYFAST RED 1308", oil-soluble blue dyes such as commercially available from BASF GmbH under the trade name of "NEOZAPON BLUE 807", and oil-soluble yellow dyes such as commercially available from Hodogaya Chemical Co., Ltd. under the trade name of "SPIRON YELLOW C-GNH". These coloring agents may be used either alone or in combination. The coloring agent is contained in the ink composition in a proportion of 1 wt % to 15 wt %, preferably 3 wt % to 12 wt %, relative to the overall ink composition. If the proportion of the coloring agent is too high, the viscosity of the resulting ink composition is increased thereby to reduce the writing smoothness. If the proportion of the coloring agent is too low, the density of an ink film of the resulting ink composition is reduced.

Organic Polar Solvent

The organic polar solvent is used as an alternative to nonpolar solvents such as benzene and toluene which have been considered to be unfavorable in terms of safety. The organic polar solvent to be used is not particularly limited, but may be an alcohol solvent or a glycol ether solvent. Examples of the alcohol solvent include aliphatic alcohols having 1 to 4 carbons such as methyl alcohol, ethyl alcohol, n-propyl alcohol, isopropyl alcohol, n-butyl alcohol, isobutyl alcohol and tert-butyl alcohol. Examples of the glycol ether solvent include propylene glycol monomethyl ether, propylene glycol monoethyl ether, dipropylene glycol monomethyl ether, diethylene glycol monomethyl ether, diethylene glycol monoethyl ether, diethylene glycol monopropyl ether, diethylene glycol monobutyl ether, diethylene glycol monomethyl ether acetate, diethylene glycol monoethyl ether acetate, diethylene glycol monopropyl ether acetate and diethylene glycol monobutyl ether acetate, among which propylene glycol monomethyl ether, propylene glycol monoethyl ether and dipropylene glycol monomethyl ether are preferred.

These organic polar solvents are used either alone or in combination. The organic polar solvent is contained in the ink composition in a proportion of about 50 wt % to about 96 wt %, preferably about 64 wt % to about 92 wt % relative to the overall ink composition. If the proportion of the organic polar solvent is too high, the density of an ink film of the resulting ink composition is reduced. If the proportion of the organic polar solvent is too low, the viscosity of the resulting ink composition is increased thereby to reduce the writing smoothness, and the coloring agent and the oil-soluble resin cannot satisfactorily be dissolved therein.

Resin

The resin is not particularly limited as long as the resin is soluble in the aforesaid organic polar solvent, but should be safe in every aspect. Examples of preferable resins include ketone resins, phenol resins (e.g., alkylphenol resins, phenol resins, rosin-modified phenol resins and the like), xylene resins (e.g., alkylphenol-modified xylene resins, rosin-modified xylene resins and the like), rosin resins, styrene-organic acid copolymers (e.g., styrene-acrylic acid copolymers, styrene-maleic acid copolymers, styrene-maleic anhydride copolymers and the like) and polyacrylates. These resins are used either alone or in combination. The resin is contained in the ink composition in a proportion of about 3 wt % to about 25 wt %, preferably about 5 wt % to about 20 wt %, relative to the overall ink composition. If the proportion of the resin is higher than the aforesaid range, the viscosity of the resulting ink composition is increased thereby to reduce the writing smoothness. If the proportion is lower than the aforesaid range, the ink film fixability (the fastness of drawn ink lines) on the surface of an article on which the resulting ink composition is applied is reduced.

Any of various additives such as a viscosity controlling agent, a structural viscosity imparting agent, a dye solubilizing agent and a drying agent may optionally be added to the ink composition of the present invention. The additives to be added are not particularly limited, but any of various known additives may be used.

Preparation Method

The ink composition according to the present invention is prepared by mixing the aforesaid ingredients (the coloring agent, the organic polar solvent, the resin, the organically modified silicone and the like). The preparation method for the ink composition is not particularly limited. For example, the resin is stirred with the organic polar solvent under heating (e.g., at 50° C.), and the coloring agent and, as required, any of the aforesaid additives are added to the resulting mixture and stirred therewith under heating (e.g., at 50° C.). After the mixing, the heating is stopped, and then the organically modified silicone is added to the resulting mixture and stirred therewith.

The ink composition of the present invention is useful for an oil marking pen, since the ink composition ensures an excellent ink film fixability on a nonabsorbent surface (a surface of a metal plate such as of tin or aluminum, or a plastic film or sheet such as of polyethylene or polypropylene, which hardly absorbs an oil ink) when applied on the surface.

EXAMPLES

The present invention will hereinafter be described in detail by way of examples and comparative examples thereof. It should be understood that the invention is not limited to these examples.

Ingredients

Used as ingredients of ink compositions in the examples and the comparative examples were the following coloring agents, organic polar solvents, oil-soluble resins and organically modified silicones.

Coloring Agents

Oil-soluble black nigrosine dye available from Chuo Synthetic Chemical Co., Ltd. under the trade name of "OIL BLACK 2030"

Oil-soluble black dye available from Orient Chemical Co., Ltd. under the trade name of "BARYFAST BLACK 3810"

Oil-soluble red dye available from Orient Chemical Co., Ltd. under the trade name of "BARYFAST RED 13081"

Oil-soluble blue dye available from BASF GmbH under the trade name of "NEOZAPON BLUE 807"

Oil-soluble yellow dye available from Hodogaya Chemical Co., Ltd. under the trade name of "SPIRON YELLOW C-GNH"

Organic Polar Solvents

Ethanol

Isopropyl alcohol

Propylene glycol monomethyl ether available from Dow Chemical Co. under the trade name of "DOWANOL PM"

Ethylene glycol monobutyl ether available from Dow Chemical Co. under the trade name of "DOWANOL EB"

Dipropylene glycol monomethyl ether available from Dow Chemical Co. under the trade name of "DOWANOL DPM"

Oil-soluble Resins

Alkylphenol resin available from Arakawa Chemical Industry Co., Ltd. under the trade name of "TAMANOL 510"

Ketone resin 1 available from Hitachi Kasei Co., Ltd. under the trade name of "HILAC 110H"

Ketone resin 2 available from Hitachi Kasei Co., Ltd. under the trade name of "HILAC 111"

Alkylphenol-modified xylene resin available from Mitsubishi Gas Co., Ltd. under the trade name of "NIKANOL HP-100"

Styrene-maleic acid resin available from Arakawa Chemical Industry Co., Ltd. under the trade name of "ARASTAR 700"

Polyacrylate available from Mitsubishi Rayon Co., Ltd. under the trade name of "DIANAL BR101"

Acryl-styrene resin available from Johnson Polymer Co., Ltd. under the trade name of "JOHNCRYL 683"

Rosin resin available from Tokushima Oil Refinery Co., Ltd. under the trade name of "ROSIN WW"

Organically Modified Silicones

Silicone 1: Polyether-modified silicone available from Tego Chemie Service GmbH under the trade name of "TEGO GLIDE 100"

Silicone 2: Polyoxypropylene-modified silicone available from Tego Chemie Service GmbH under the trade name of "TEGO GLIDE A-115"

Silicone 3: Polyether-modified silicone available from Tego Chemie Service GmbH under the trade name of "TEGO GLIDE 410"

Silicone 4: Polyether-modified silicone available from Tego Chemie Service GmbH under the trade name of "TEGO GLIDE 440"

Silicone 5: Polyoxypropylene-modified silicone available from Toshiba silicone Co., Ltd. under the trade name of "TSF4460"

Additive

Nigrosine dye solubilizing agent (oleic acid)

EXAMPLES 1 TO 10 AND COMPARATIVE EXAMPLES 1 TO 11

Oil marking pen ink compositions of Examples 1 to 10 and Comparative Examples 1 to 11 were prepared by blending ingredients in proportions (wt %) as shown in Tables 1 to 4. More specifically, an oil-soluble resin was stirred with an organic polar solvent for 1 hour at 50° C. under heating, and then a coloring agent (oil-soluble dye) and an additive were added to the resulting mixture and stirred therewith for 30 minutes at 50° C. under heating. After the mixing, the heating was stopped, and an organically modified silicone was added to the resulting mixture and stirred therewith for 10 minutes. Thus, the oil marking pen ink compositions of Examples 1 to 10 and Comparative Examples 1 to 11 were prepared.

TABLE 1

| | Examples | | | | |
|---|---|---|---|---|---|
| | 1 | 2 | 3 | 4 | 5 |
| Oil - soluble black nigrosine dye | 8.0 | | | | |
| Oil - soluble black dye | | 10.0 | | | |
| Oil - soluble red dye | | | 6.0 | | |
| Oil - soluble blue dye | | | | | 8.0 |
| Oil - soluble yellow dye | | 2.0 | | 3.0 | 3.0 |
| Ethanol | 30.0 | 10.0 | 10.0 | 15.0 | |
| Isopropyl alcohol | | 52.98 | 39.95 | | 20.0 |
| Propylene glycol monomethyl ether | 51.9 | | 30.0 | 52.4 | 46.7 |
| Dipropylene glycol monomethyl ether | | 15.0 | | 8.0 | 10.0 |
| Alkyphenol resin | 3.5 | 5.0 | 12.0 | 7.0 | |
| Ketone resin 1 | 1.5 | | 2.0 | | 12.0 |
| Alkylphenol modified xylene resin | | 5.0 | | 6.4 | 8.0 |
| Silicone 1 | 0.1 | | 0.05 | | |
| Silicone 2 | | | | 0.2 | |
| Silicone 3 | | 0.02 | | | |
| Silicone 4 | | | | | 0.3 |
| Oleic acid | 5.0 | | | | |
| Fixability evaluation test — Aluminum plate | ○ | ○ | Δ | ○ | ○ |
| Fixability evaluation test — Propylene plate | ○ | ○ | ○ | ○ | ○ |

TABLE 2

| | Comparative Examples | | | | |
|---|---|---|---|---|---|
| | 1 | 2 | 3 | 4 | 5 |
| Oil - soluble black nigrosine dye | 8.0 | | | | |
| Oil - soluble black dye | | 10.0 | | | |
| Oil - soluble red dye | | | 6.0 | | |
| Oil - soluble blue dye | | | | | 8.0 |
| Oil - soluble yellow dye | | 2.0 | | 3.0 | 3.0 |
| Ethanol | 30.0 | 10.0 | 10.0 | 15.0 | |
| Isopropyl alcohol | | 53.0 | 40.0 | | 20.0 |
| Propylene glycol monomethyl ether | 52.0 | | 30.0 | 52.6 | 47.0 |
| Dipropylene glycol monomethyl ether | | 15.0 | | 8.0 | 10.0 |
| Alkylphenol resin | 3.5 | 5.0 | 12.0 | 7.0 | |
| Ketone resin 1 | 1.5 | | 2.0 | | 12.0 |
| Alkylphenol modified xylene resin | | 5.0 | | 6.4 | 8.0 |
| Silicone 1 | | | | | |
| Silicone 2 | | | | | |
| Silicone 3 | | | | | |
| Silicone 4 | | | | | |
| Oleic acid | 5.0 | | | | |
| Fixability evaluation test — Aluminum plate | X | X | X | X | X |
| Fixability evaluation test — Propylene plate | X | X | X | X | X |

TABLE 3

| | Examples | | | | |
|---|---|---|---|---|---|
| | 6 | 7 | 8 | 9 | 10 |
| Oil - soluble black nigrosine dye | | | 8 | | |
| Oil - soluble red dye | | | | 6 | 6 |
| Oil - soluble blue dye | 8 | 3 | | | |
| Oil - soluble yellow dye | 3 | | | | 4 |
| Ethanol | 15 | 20 | 30 | | 14 |
| Isopropyl alcohol | 15 | | | 20 | 60 |
| Propylene glycol monomethyl ether | 40 | 47 | 48 | 60 | |
| Ethylene glycol monobutyl ether | | 6 | 3 | | 4 |
| Dipropylene glycol monomethyl ether | 9.5 | | | 3.8 | |
| Alkylphenol resin | | 12 | 4 | 5 | 6 |
| Ketone resin 2 | 7 | | | 3 | |
| Alkylphenol modified xylene resin | 2 | 5 | | | 3 |
| Styrene - maleic acid resin | | | 1 | | 1 |
| Polyacrylate | | | | 2 | |
| Acryl - styrene resin | | 3 | | | |
| Rosin resin | | | 0.1 | | |
| Silicone 2 | 0.5 | 4 | | 0.2 | |
| Silicone 5 | | | | 1 | 2 |
| Oleic acid | | | 5 | | |
| Fixability evaluation test — Tin plate | ○ | ○ | ○ | ○ | ○ |
| Fixability evaluation test — Propylene plate | ○ | ○ | Δ | Δ | ○ |

TABLE 4

| | Comparative Examples | | | | | |
|---|---|---|---|---|---|---|
| | 6 | 7 | 8 | 9 | 10 | 11 |
| Oil - soluble black nigrosine dye | | | 8 | | | 8 |
| Oil - soluble red dye | | | | 6 | 6 | |
| Oil - soluble blue dye | 8 | 3 | | | | |
| Oil - soluble yellow dye | 3 | | | | 4 | |
| Ethanol | 15 | 20 | 30 | | 14 | 30 |
| Isopropyl alcohol | 15 | | | 20 | 60 | |
| Propylene glycol monomethyl ether | 40 | 47 | 48 | 60 | | 48 |
| Ethylene glycol monobutyl ether | | 6 | 3 | | 4 | 3 |
| Dipropylene glycol monomethyl ether | 9.5 | | | 3.8 | | |
| Alkylphenol resin | | 12 | 4 | 5 | 6 | |
| Ketone resin 2 | 7 | | | 3 | | |
| Alkylphenol modified xylene resin | 2 | 5 | | | 3 | |
| Styrene-maleic acid resin | | | 1 | | 1 | 1 |
| Polyacrylate | | | | 2 | | |
| Acryl - styrene resin | | 3 | | | | |
| Rosin resin | | | | | | 4 |
| Silicone 2 | | | | | | |
| Silicone 5 | | | | | | |
| Oleic acid | | | 5 | | | 5 |
| Fixability evaluation test — Tin plate | Δ | Δ | Δ | Δ | Δ | X |
| Fixability evaluation test — Propylene plate | X | X | X | X | X | X |

Fixability Evaluation Test

The oil marking pen ink compositions of Examples 1 to 10 and Comparative Examples 1 to 11 were each filled in a writing instrument with a felt pen tip (an oil marker pen available from Sakura Kurepasu Co., Ltd. under the trade name of "PEN TOUCH"). In a fixability evaluation test, a line was drawn directly on a nonabsorbent surface (an aluminum plate or a tin plate, and a polypropylene plate or a polyethylene plate) with the oil marker pen thus obtained. The resulting ink film was allowed to stand for 30 minutes for drying thereof, and then rubbed with a cotton swab with a load of 500 g. An ink composition which provided an ink film fully scraped away with the cotton swab so that the nonabsorbent surface was exposed was rated as "No Good (X)". An ink composition which provided an ink film slightly scratched with the cotton swab was rated as "Acceptable (Δ)". An ink composition which provided an ink film not affected by the rubbing with the cotton swab was rated as "Excellent (○)". The evaluation results are shown in Tables 1 to 4.

As apparent from Tables 1 to 4, the oil marking pen ink compositions according to the present invention (Examples 1 to 10) each provided an ink film (ink line) having a more excellent fixability on the nonabsorbent surface than the alcohol-based oil marking pen ink compositions containing no organically modified silicone (Comparative Examples).

In accordance with the present invention, the ink composition for an oil marking pen contains a coloring agent, an organic polar solvent, a resin and an organically modified silicone. Although the organic polar solvent is contained in the ink composition, the resulting ink film has an excellent fixability on a nonabsorbent surface. Particularly, the use of a polyoxypropylene modified silicone as the organically modified silicone ensures an improved ink film fixability on the nonabsorbent surface.

Further, the ink composition of the present invention ensures an ink film fixability on the nonabsorbent surface (e.g., a metal surface and a plastic surface) that is equivalent to or greater than that of the ink composition containing a nonpolar solvent (e.g., xylene) as the solvent. Thus, the ink composition of the present invention is excellent in the ink film fixability on the nonabsorbent surface, and highly safe in every aspect.

What is claimed is:

1. An ink composition for an oil marking pen, comprising an organic polar solvent containing a coloring agent soluble and dissolved in said organic polar solvent, a resin soluble and dissolved in said organic polar solvent and a silicone having organic groups attached to Si atoms, wherein said silicone is a polyether-modified silicone which includes polyoxypropylene in a proportion of 50% by weight or greater of the polyoxypropylene portion relative to the overall polyether portion and which has a number average molecular weight of 1,000 to 60,000, and said organic polar solvent is contained in a proportion of from about 50% by weight to about 96% by weight relative to the overall ink composition.

2. An ink composition as set forth in claim 1, wherein said silicone is contained in the ink composition in a proportion of 0.005 wt % to 10 wt % relative to the overall ink composition.

3. An ink composition as set forth in claim 1, wherein said silicone is a polyoxypropylene-modified silicone.

4. An ink composition as set forth in claim 3, wherein the polyoxypropylene-modified silicone has a number average molecular weight of 2,000 to 20,000.

5. An ink composition as set forth in claim 4, wherein the polyoxypropylene-modified silicone is contained in the ink composition in a proportion of 0.01 wt % to 10 wt % relative to the overall ink composition.

6. An ink composition as set forth in claim 1, wherein the organic polar solvent is an alcohol or a glycol ether.

7. An ink composition as set forth in claim 1, wherein the resin soluble and dissolved in said organic polar solvent is at least one selected from the group consisting of a ketone resin, a phenol resin, a xylene resin, a rosin resin, a styrene-organic acid copolymer and a polyacrylate.

8. An ink composition as set forth in claim 1 further comprising at least one of a viscosity controlling agent, a structural viscosity imparting agent, a dye solubilizing agent and a drying agent.

9. An ink composition for an oil marking pen comprising an organic polar solvent, a coloring agent soluble and dissolved in said organic polar solvent, a resin soluble and dissolved in said organic polar solvent and a silicone having organic groups attached to the Si atoms, wherein said silicone is a polyoxypropylene-modified silicone having a number average molecular weight of 2,000 to 20,000, and said organic polar solvent is contained in a proportion of from about 50% by weight to about 96% by weight relative to the overall ink composition.

10. An ink composition as set forth in claim 1, wherein a resin soluble in said organic polar solvent is contained in a proportion of 5–20% by weight relative to the overall ink composition.

11. An ink composition for an oil marking pen consisting essentially of an organic polar solvent containing a coloring agent soluble and dissolved in said organic polar solvent, a resin soluble and dissolved in said organic polar solvent, and a silicone having organic groups attached to the Si atoms, wherein said silicone is a polyoxypropylene-modified silicone and said organic polar solvent is contained in a proportion of from about 50% by weight to about 96% by weight relative to the overall ink composition.

12. An ink composition as set forth in claim 11, wherein said silicone is contained in a proportion of 0.005 wt % to 10 wt % relative to the overall ink composition.

13. An ink composition as set forth in claim 11, wherein said silicone has a number average molecular weight of 1,000 to 60,000.

14. An ink composition as set forth in claim 11, wherein said silicone is a polyoxypropylene-modified silicone having a number average molecular weight of 2,000 to 20,000.

15. An ink composition as set forth in claim 11, wherein polyoxypropylene-modified silicone is contained in a proportion of 0.01% to 10% by weight relative to the overall ink composition.

16. An ink composition as set forth in claim 11, wherein said organic polar solvent is an alcohol or a glycol ether.

17. An ink composition as set forth in claim 11, wherein said resin soluble in an organic polar solvent is at least one selected from the group consisting of a ketone resin, a phenol resin, a xylene resin, a rosin resin, a styrene-organic acid copolymer and a polyacrylate.

18. An ink composition as set forth in claim 11 further comprising at least one of a viscosity controlling agent, a structural viscosity imparting agent, a dye solubilizing agent and a drying agent.

19. A method for forming an ink film of ink composition for an oil marking pen wherein an ink composition comprising a coloring agent, an organic polar solvent, a resin soluble in said organic polar solvent and a silicone having organic groups attached to the Si atoms is applied on a non-absorbent surface and said silicone of the ink composition migrates to the surface of the ink film, wherein said silicone is a polyether-modified silicone which includes polyoxypropylene in a proportion of 50% by weight or greater of the polyoxypropylene portion relative to the overall polyether portion, and said organic polar solvent is contained in a proportion of from about 50% by weight to about 96% by weight relative to the overall ink composition.

* * * * *